(12) United States Patent
Kurihara et al.

(10) Patent No.: US 11,087,929 B2
(45) Date of Patent: Aug. 10, 2021

(54) ELECTROLYTIC CAPACITOR AND METHOD FOR PRODUCING SAME

(71) Applicant: Panasonic Intellectual Property Management Co., Ltd., Osaka (JP)

(72) Inventors: Naomi Kurihara, Osaka (JP); Keita Uenaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 158 days.

(21) Appl. No.: 16/430,181

(22) Filed: Jun. 3, 2019

(65) Prior Publication Data

US 2019/0287731 A1 Sep. 19, 2019

Related U.S. Application Data

(63) Continuation of application No. PCT/JP2017/043902, filed on Dec. 7, 2017.

(30) Foreign Application Priority Data

Dec. 28, 2016 (JP) ............................. JP2016-256139

(51) Int. Cl.
*H01G 9/10* (2006.01)
*H01G 9/15* (2006.01)
*H01G 9/012* (2006.01)

(52) U.S. Cl.
CPC ................ *H01G 9/10* (2013.01); *H01G 9/15* (2013.01); *H01G 9/012* (2013.01)

(58) Field of Classification Search
CPC .......... H01G 9/012; H01G 9/025; H01G 9/08; H01G 9/10
See application file for complete search history.

(56) References Cited

U.S. PATENT DOCUMENTS

| 5,922,465 A | 7/1999 | Gailberger et al. |
| 2011/0274831 A1 | 11/2011 | Saegusa et al. |
| 2015/0155103 A1 | 6/2015 | Kato |
| 2016/0379817 A1 | 12/2016 | Okamura et al. |
| 2018/0108487 A1* | 4/2018 | Petrzilek .............. H01G 9/0032 |

(Continued)

FOREIGN PATENT DOCUMENTS

| CN | 104603896 A | 5/2015 |
| CN | 105793963 A | 7/2016 |
| JP | 1-304701 | 12/1989 |

(Continued)

OTHER PUBLICATIONS

English Translation of Chinese Office Action dated Oct. 10, 2020 for the related Chinese Patent Application No. 201780080209.5.

(Continued)

*Primary Examiner* — Eric W Thomas
(74) *Attorney, Agent, or Firm* — McDermott Will & Emery LLP

(57) ABSTRACT

An electrolytic capacitor includes a capacitor element, a lead member, an outer packaging resin layer, and a silica film. The lead member is electrically connected to the capacitor element. The outer packaging resin layer covers the capacitor element and a part of the lead member. The silica film covers at least a part of the outer packaging resin layer.

7 Claims, 2 Drawing Sheets

(56) References Cited

U.S. PATENT DOCUMENTS

2018/0321090 A1* 11/2018 Petrzilek ................ G01R 31/64

FOREIGN PATENT DOCUMENTS

| JP | 10-067949 | 3/1998 |
| JP | 2010-192539 | 9/2010 |
| JP | 2014-195052 | 10/2014 |
| WO | 2014/034076 | 3/2014 |

OTHER PUBLICATIONS

International Search Report of PCT application No. PCT/JP2017/043902 dated Feb. 27, 2018.

* cited by examiner

US 11,087,929 B2

ELECTROLYTIC CAPACITOR AND METHOD FOR PRODUCING SAME

RELATED APPLICATIONS

This application is a continuation of the PCT International Application No. PCT/JP2017/043902 filed on Dec. 7, 2017, which claims the benefit of foreign priority of Japanese patent application No. 2016-256139 filed on Dec. 28, 2016, the contents all of which are incorporated herein by reference.

BACKGROUND

1. Technical Field

The present disclosure relates to an electrolytic capacitor including an outer packaging resin layer covering a capacitor element, and a method for producing the electrolytic capacitor.

2. Description of the Related Art

An electrolytic capacitor includes a capacitor element, a lead member electrically connected to the capacitor element, and an outer packaging resin layer covering the capacitor element and a part of the lead member. If the outer packaging resin layer has low sealing properties, air (oxygen and moisture) may enter into the electrolytic capacitor. When air entering into the electrolytic capacitor comes into contact with a solid electrolyte layer included in the capacitor element, a conductive polymer contained in the solid electrolyte layer may be degraded.

Thus, Unexamined Japanese Patent Publication No. 10-67949 proposes that in order to improve sealing properties of an outer packaging resin layer, a silicone oil and a fluorine-based water-repellant are coated on a surface of the outer packaging resin layer to form a moisture-proof coating layer.

SUMMARY

An electrolytic capacitor according to one aspect of the present disclosure includes a capacitor element, a lead member, an outer packaging resin layer, and a silica film. The lead member is electrically connected to the capacitor element. The outer packaging resin layer covers the capacitor element and a part of the lead member. The silica film covers at least a part of the outer packaging resin layer.

A method for producing an electrolytic capacitor according to another aspect of the present disclosure includes the following first to third steps. In the first step, a capacitor element and a part of a lead member electrically connected to the capacitor element are covered with an outer packaging resin layer. In the second step, a silica precursor is adhered to at least a part of the outer packaging resin layer. In the third step, a silica film covering at least the part of the outer packaging resin layer is formed by reacting the silica precursor.

According to the present disclosure, it is possible to provide an electrolytic capacitor that can obtain excellent sealing properties even when the electrolytic capacitor exposed to high temperature for a long period of time and a method for producing the electrolytic capacitor.

DETAILED DESCRIPTION OF EMBODIMENT

Figure 1:
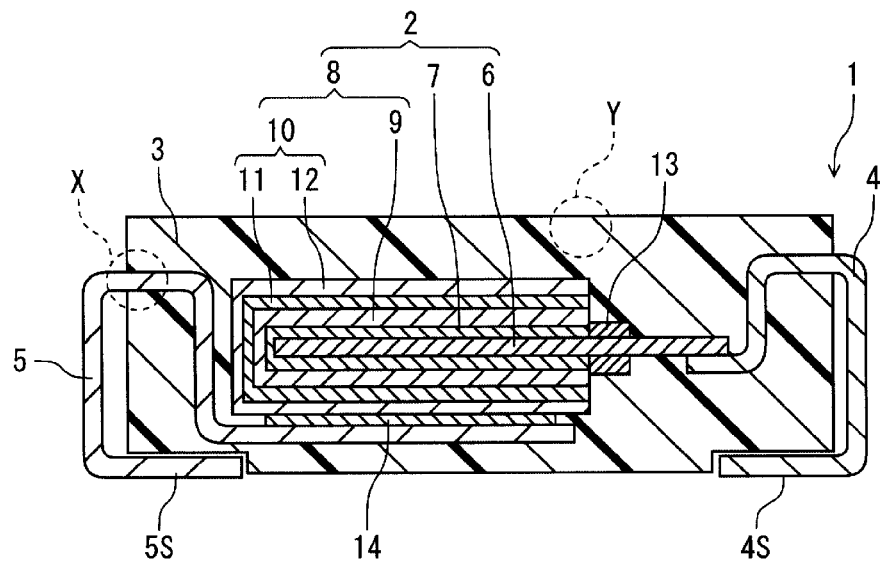
FIG. 1 is a cross-sectional view schematically illustrating an electrolytic capacitor according to one exemplary embodiment of the present disclosure.

In an electrolytic capacitor disclosed in Unexamined Japanese Patent Publication No. 10-67949, an adhesiveness between a coating layer, which is formed using a fluorine-based water-repellant, and an outer packaging resin layer tends to decrease due to time degradation, and it is difficult to maintain coatability of the coating layer for a long period of time. In the coating layer formed using a silicone oil, upon exposure to high temperatures in reflow processes or the like, the coatability of the coating layer may decrease due to elution of components such as a plasticizer contained in the outer packaging resin layer.

[Electrolytic Capacitor]

An electrolytic capacitor according to an embodiment of the present disclosure includes a capacitor element, a lead member electrically connected to the capacitor element, an outer packaging resin layer covering the capacitor element and a part of the lead member, and a silica film covering at least a part of the outer packaging resin layer.

The silica film serves to improve sealing properties of the electrolytic capacitor. The silica film is excellent in chemical stability and thermal stability. Thus, even under a high temperature and high humidity atmosphere, high coatability of the silica film can be obtained, and an electrolytic capacitor having excellent sealing properties can be obtained. The high sealing properties of the electrolytic capacitor are maintained for a long period of time. Since infiltration of oxygen and moisture into the electrolytic capacitor is suppressed, degradation of a conductive polymer in a solid electrolyte layer due to the infiltration of oxygen and moisture into the electrolytic capacitor is suppressed. Thus, problem such as an increase in ESR due to degradation of the conductive polymer is suppressed.

Particularly, a silica film formed using polysilazane is a dense and hard film. Covering with such a film further suppresses infiltration of oxygen and moisture into the electrolytic capacitor. In addition, the silica film formed using polysilazane is also excellent in adhesiveness to the outer packaging resin layer and the lead member. Thus, even under a high temperature and high humidity atmosphere, excellent sealing properties can be maintained.

The silica film may cover the entire outer surface of the outer packaging resin layer. Alternatively, the silica film may be partially formed on the surface of the outer packaging resin layer. By using a small amount of the silica film which is partially formed, infiltration of oxygen and moisture into the electrolytic capacitor can be efficiently suppressed.

For example, when the electrolytic capacitor has a gap in a part of an interface between the lead member and the outer packaging resin layer, it is preferable to form the silica film to fill the gap. In this case, infiltration of air into the electrolytic capacitor through the gap existing at the interface between the lead member and the outer packaging resin layer is suppressed.

Further, it is preferable that the silica film be formed to permeate partially into a surface portion of the outer packaging resin layer. It is noted that the surface portion of the outer packaging resin layer refers to a region defined by approximately 0.1 mm in depth from the surface (outer surface) of the outer packaging resin layer. In this case, infiltration of oxygen and moisture into the electrolytic capacitor from the surface portion of the outer packaging resin layer is suppressed. The case where the silica film is formed to permeate partially into the surface portion of the outer packaging resin layer includes a case where the silica film is formed to fill minute irregularities or gaps (such as cracks and holes) existing on the surface of the outer packaging resin layer. In some cases, cracks and the like may be formed in a portion deeper than the surface portion. Even in such a case, the silica film can be formed to fill cracks and the like formed in a portion deeper than the surface portion. However, the sealing properties of the electrolytic capacitor are satisfactorily secured as long as the silica film is formed to fill cracks and the like, at least on the surface portion of the outer packaging resin layer.

(Outer Packaging Resin Layer)

The outer packaging resin layer preferably contains a cured product of a curable resin composition. And the outer packaging resin layer may contain a thermoplastic resin or a composition containing the thermoplastic resin. As a curable resin composition and a thermoplastic resin (composition), those to be described later can be used.

(Lead Member)

As the lead member, a lead frame is used, for example. Examples of the material for the lead member include metal such as copper or copper alloy.

(Capacitor Element)

The capacitor element includes, for example, an anode body, a dielectric layer covering the anode body, and a cathode part covering the dielectric layer. The cathode part includes a solid electrolyte layer covering the dielectric layer and a cathode lead-out layer covering the solid electrolyte layer.

(Anode Body)

The anode body may include a valve metal, an alloy containing a valve metal, and a compound containing a valve metal. One of these materials can be used alone, or two or more of these materials can be used in combination. As the valve metal, for example, aluminum, tantalum, niobium, or titanium is preferably used. The anode body having a porous surface can be obtained by, for example, roughening a surface of a base material (such as a foil-like or plate-like base material) including a valve metal by etching or the like. Further, the anode body may be a molded body of particles including a valve metal or a sintered body of the molded body. The sintered body has a porous structure. That is, when the anode body is a sintered body, the whole anode body can be porous.

(Dielectric Layer)

The dielectric layer is formed by anodizing, through an anodizing treatment or the like, the valve metal on a surface of the anode body. The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. Note that dielectric layer is not limited to these examples, and any layer is acceptable as the dielectric layer as long as the layer functions as a dielectric body. When a surface of the anode body is porous, the dielectric layer is formed along the surface of the anode body (including inner wall faces of holes).

(Solid Electrolyte Layer)

The solid electrolyte layer contains, for example, a manganese compound and a conductive polymer. It is possible to use, as the conductive polymer, for example, polypyrrole, polythiophene, polyaniline, and derivatives of them. The solid electrolyte layer can be formed through, for example, chemical polymerization and/or electrolytic polymerization of raw material monomer on a dielectric layer. Alternatively, the solid electrolyte layer can be formed by coating the dielectric layer with a solution in which the conductive polymer is dissolved or a dispersion liquid in which the conductive polymer is dispersed.

(Cathode Lead-Out Layer)

The cathode lead-out layer includes a carbon layer and a silver paste layer. The carbon layer is only required to have conductivity, and the carbon layer can be configured, for example, by use of a conductive carbon material such as graphite. For a silver paste layer, for example, there can be used a composition including a silver powder and a binder resin (e.g., an epoxy resin). A configuration of the cathode lead-out layer is not limited to this example, and it is sufficient if the cathode lead-out layer has a current collection function.

Figure 2:
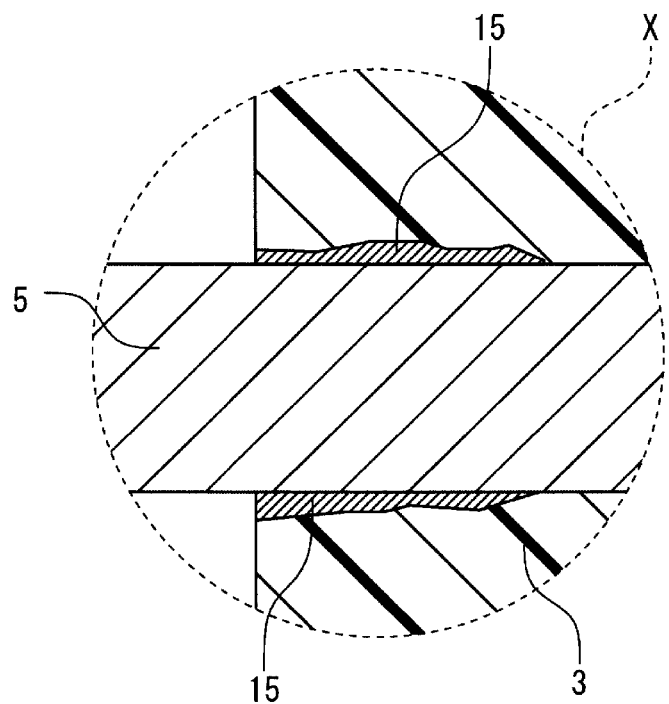
FIG. 2 is an enlarged cross-sectional view of an X portion of FIG. 1.
Figure 3:
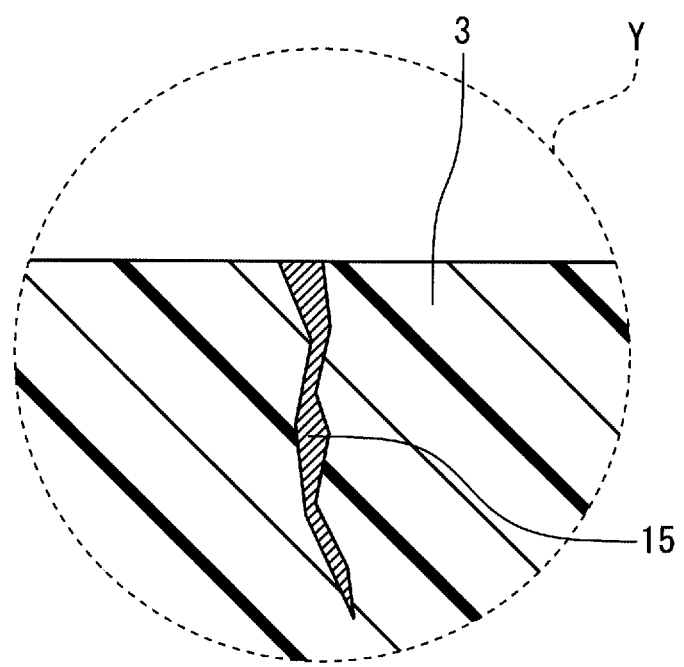
FIG. 3 is an enlarged cross-sectional view of a Y portion of FIG. 1.

FIG. 1 is a cross-sectional view schematically showing a configuration of an electrolytic capacitor according to one exemplary embodiment of the present disclosure. FIG. 2 is an enlarged cross-sectional view of an X portion of FIG. 1. FIG. 3 is an enlarged cross-sectional view of a Y portion of FIG. 1.

As shown in FIG. 1, electrolytic capacitor 1 includes capacitor element 2, outer packaging resin layer 3 for sealing capacitor element 2, and anode terminal 4 (anode lead frame) and cathode terminal 5 (cathode lead frame) at least partially exposed to the outside of outer packaging resin layer 3. Outer packaging resin layer 3 has an outer shape that is a substantially rectangular parallelepiped, and electrolytic capacitor 1 also has an outer shape that is a substantially rectangular parallelepiped.

Silica film 15 covers at least a part of outer packaging resin layer 3. For example, as shown in FIG. 2, it is preferable that silica film 15 fills a gap existing in a part of an interface between outer packaging resin layer 3 and cathode terminal 5. Further, preferably, when there is a gap in a part of an interface between outer packaging resin layer 3 and anode terminal 4, a silica film (not shown) fills this gap. For example, as shown in FIG. 3, it is preferable that silica film 15 permeates partially into a surface portion of outer packaging resin layer 3. That is, it is preferable that silica film 15 be formed to fill irregularities or gaps (such as cracks and holes) existing on the surface of the outer packaging resin layer.

Main surface 4S of anode terminal 4 and main surface 5S of cathode terminal 5 are exposed from outer packaging resin layer 3 at the same surface of outer packaging resin layer 3. These exposed surfaces are used for soldering connection with a substrate (not shown) on which electrolytic capacitor 1 is to be mounted.

Capacitor element 2 includes anode body 6, dielectric layer 7 covering anode body 6, and cathode part 8 covering dielectric layer 7. Cathode part 8 includes solid electrolyte layer 9 covering dielectric layer 7 and cathode lead-out layer 10 covering solid electrolyte layer 9. Cathode lead-out layer 10 includes carbon layer 11 and silver paste layer 12.

Anode body 6 includes a region that faces cathode part 8 and a region that does not face cathode part 8. In the region that does not face cathode part 8, on a part adjacent to cathode part 8, insulating separation layer 13 is formed on a part adjacent to cathode part 8 so as to zonally cover a surface of anode body 6, thereby preventing contact between cathode part 8 and anode body 6. In the region that does not face cathode part 8, another part is electrically connected to anode terminal 4 by welding. Cathode terminal 5 is electrically connected to cathode part 8 via adhesive layer 14 formed of a conductive adhesive.

As anode body 6, one made by roughening a surface of a base material (such as a foil-like or plate-like base material) including a valve metal is used. For example, one made by roughening a surface of an aluminum foil by etching is used as anode body 6. Dielectric layer 7 contains $Al_2O_3$, for example.

Dielectric layer 7 is formed along a porous surface (including inner wall faces of holes) of anode body 6. A surface of dielectric layer 7 is formed to have an irregular shape corresponding to a shape of the surface of anode body 6. Preferably, solid electrolyte layer 9 is formed so as to fill such irregularities of dielectric layer 7.

The electrolytic capacitor of the present disclosure is not limited to an electrolytic capacitor having the above structure and can be applied to electrolytic capacitors having various structures. Specifically, the present disclosure can also be applied to, for example, an electrolytic capacitor including a metal powder sintered body as the anode body.

[Method for Producing Electrolytic Capacitor]

A method for producing an electrolytic capacitor according to the embodiment of the present disclosure includes the following steps. A first step is covering a capacitor element and a part of a lead member with an outer packaging resin layer. The portion being electrically connected to the capacitor element. A second step is causing a silica precursor to adhere to at least a part of the outer packaging resin layer. And a third step is reacting the silica precursor to form a silica film covering at least a part of the outer packaging resin layer.

Hereinafter, the first to third steps will be described in detail.

(Step of Forming Outer Packaging Resin Layer)

In the first step, after the capacitor element and the lead member are electrically connected, the capacitor element and a part of the lead member are covered with the outer packaging resin layer to obtain an electrolytic capacitor.

The outer packaging resin layer can be formed by a molding technique such as injection molding, insert molding, or compression molding. The outer packaging resin layer can be formed by, for example, using a predetermined mold and filling a curable resin composition or a thermoplastic resin (composition) in a predetermined portion so as to cover a part of the lead member together with an outer surface of the capacitor element.

The curable resin composition may include not only a curable resin but also a filler, a curing agent, a polymerization initiator, and/or a catalyst. Examples of the curable resin include a photo-curable resin and a thermosetting resin. A curing agent, a polymerization initiator, a catalyst, or the like is appropriately selected depending on a type of the curable resin.

As the curable resin, for example, a compound cured or polymerized by an effect of heat (for example, a monomer, oligomer, or prepolymer) is used. Such compounds (or curable resins) include, for example, an epoxy resin, phenolic resin, urea resin, polyimide, polyamide-imide, polyurethane, diallyl phthalate, and unsaturated polyester. The curable resin composition may contain a plurality of curable resins.

It is preferable to use, as a filler, for example, insulating particles (inorganic particles/organic particles) and/or fiber. Examples of the insulating material for a filler include an insulating compound (oxide or the like) such as silica or alumina, glass, and a mineral material (for example, talc, mica, or clay). From the viewpoint of improving adhesiveness between a silica film formed using polysilazane or the like and the outer packaging resin layer, the outer packaging resin layer preferably contains silica particles as a filler. The outer packaging resin layer may contain one type or two or more types of these fillers. A filler content in the outer packaging resin layer is for example between 10% by mass and 90% by mass (inclusive).

Examples of the thermoplastic resin include polyphenylene-sulfide (PPS) and polybutylenetelephthalate (PBT). A thermoplastic resin-containing composition may contain the filler described above and the like in addition to the thermoplastic resin.

(Step of Forming Silica Film)

In this step, the second step and the third step are performed. In the second step, it is preferable that a silica precursor be adhered to at least a part of the outer packaging resin layer with the use of a solution of the silica precursor.

In the second step, for example, preferably the solution of the silica precursor is partially impregnated in the interface between the lead member and the outer packaging resin layer. At this time, the silica precursor can be caused to enter a gap existing in a part of the interface between the lead member and the outer packaging resin layer.

In the second step, for example, preferably the solution of the silica precursor is partially impregnated in the surface portion of the outer packaging resin layer. At this time, the silica precursor can be adhered to fill irregularities or gaps (such as holes and cracks) existing on the surface of the outer packaging resin layer.

The silica precursor is preferably polysilazane (for example, perhydropolysilazan). In the third step, a silica film can be easily formed by reaction between polysilazane and the moisture in the air. In the second step, a solution of polysilazane is preferably used. The solution of polysilazane contains, for example, polysilazane and an organic solvent. Examples of the organic solvent include toluene and xylene. The solution of polysilazane may further contain a small amount of catalyst (such as an amine-based catalyst).

In the second step, the solution of polysilazane is used, and polysilazane can be easily adhered to a minute gap existing in a part of the interface between the lead member and the outer packaging resin layer and minute irregularities or gaps existing on the surface of the outer packaging resin layer. In the third step, polysilazane is reacted with moisture, and a thin (for example, with a thickness of less than or equal to 1 μm) and minute silica film can be densely formed to fill minute gaps and irregularities described above.

Hereinafter, an example of a step of forming a silica film using a solution of polysilazane will be described.

In the second step, the electrolytic capacitor may be immersed in the solution of polysilazane under reduced pressure. The electrolytic capacitor may be immersed in the solution of polysilazane under pressure. At this time, polysilazane can be caused to enter and can be adhered to a gap existing in a part of the interface between the lead member and the outer packaging resin layer and a recess or gap existing on the surface of the outer packaging resin layer.

Next, an excessive polysilazane solution adhered to the surface of the electrolytic capacitor (outer surface of the outer packaging resin layer) may be removed. After washing with an organic solvent such as toluene or the like, drying may be performed. At this time, polysilazane entering a gap existing in a part of the interface between the lead member and the outer packaging resin layer and a recess or gap existing on the surface of the outer packaging resin layer is not removed and remains. Consequently, in the third step, a silica film can be efficiently formed at a portion on the surface of the outer packaging resin layer where air tends to enter inside the electrolytic capacitor. Excellent sealing properties can be obtained by a small amount of the silica film.

In the third step, an electrolytic capacitor, in which polysilazane is adhered to a part of the outer packaging resin layer, is heated. At this time, the reaction between polysilazane and the moisture in the air is promoted to easily form a silica film. The heating temperature ranges, for example, from 50° C. to 300° C., inclusive. The heating time ranges, for example, from 10 minutes to 3 hours, inclusive.

The silica film may be formed by a sol-gel method. For example, in the second step, a solution containing alkoxysilane such as tetraethoxysilane may be used as the solution of the silica precursor, and in the third step, hydrolysis reaction and condensation reaction of alkoxysilane may be proceeded to form a silica film. Note that, in the sol-gel method, water is produced during condensation reaction. From the viewpoint of obtaining stable sealing properties by producing no water during the reaction, it is preferable that the silica film be obtained by a method using polysilazane as the silica precursor described above.

The above production method may further include a step of producing a capacitor element (a step of preparing an anode body, a step of forming a dielectric layer, a step of forming a solid electrolyte layer, a step of forming a cathode lead-out layer) before the first step. Hereinafter, the steps will be described in more detail.

(Step of Preparing Anode Body)

In this step, the anode body is formed by a publicly known method according to a kind of the anode body.

The anode body can be prepared by, for example, roughening a surface of a foil-like or plate-like base material including a valve metal. In the roughening, it is enough that irregularities can be formed on the base material surface, and for example, roughening may be performed by etching (for example, electrolytic etching) the base material surface.

In addition, valve metal powders are prepared, and then, in a state in which one end side of a rod-like anode lead in a longitudinal direction is embedded in aggregation of the powders, a molded body molded into a desired shape (for example, block-like shape) is obtained. This molded body may be sintered to form an anode body of porous structure in which one end of the anode lead is embedded.

(Step of Forming Dielectric Layer)

In this step, a dielectric layer is formed on the anode body. The dielectric layer is formed by anodizing the anode body. The anodizing can be performed by a publicly known method, for example, an anodizing treatment. The anodizing treatment can be performed by, for example, immersing the anode body in an anodizing solution to impregnate the surface of the anode body with the anodizing solution and applying a voltage between the anode body as an anode and a cathode immersed in the anodizing solution. It is preferable to use, for example, a phosphoric acid aqueous solution as the anodizing solution.

(Step of Forming Solid Electrolyte Layer)

In this step, a solid electrolyte layer is formed on a dielectric layer. For example, a treatment liquid containing a conductive polymer is adhered to an anode body formed with a dielectric layer and is then dried to form a solid electrolyte layer. The treatment liquid may further contain other components such as dopant. As a conductive polymer, for example, poly(3,4-ethylenedioxythiophene) (PEDOT) is used. As a dopant, for example, polystyrene sulfonic acid (PSS) is used. The treatment liquid is a dispersion liquid or a solution of the conductive polymer. Examples of a dispersion medium (solvent) include water, organic solvent, and mixtures of them.

(Step of Forming Cathode Lead-Out Layer)

In this step, a cathode lead-out layer is formed by sequentially stacking a carbon layer and a silver paste layer on a solid electrolyte layer.

EXAMPLES

Hereinafter, the present disclosure is specifically described with reference to examples and comparative examples. The present disclosure, however, is not limited to the examples below.

Example 1

Electrolytic capacitor 1 shown in FIG. 1 was fabricated in the manner described below, and characteristics of the electrolytic capacitor were evaluated.

(1) Production of Capacitor Element

An aluminum foil (with a thickness of 100 μm) was prepared as a base material, and etching was performed on a surface of the aluminum foil, so that anode body 6 is obtained. Anode body 6 was immersed in a phosphate acid solution in a concentration of 0.3% by mass (at a liquid temperature of 70° C.), and a DC voltage of 70 V was applied for 20 minutes, thereby forming dielectric layer 7 containing an aluminum oxide ($Al_2O_3$) on a surface of anode body 6. After that, an insulating resist tape (separation layer 13) was attached at a prescribed position of anode body 6.

Anode body 6 formed with dielectric layer 7 is immersed in an aqueous dispersion (with a concentration of 2% by mass) of poly(3,4-ethylenedioxythiophene) (PEDOT) doped with polystyrenesulfonic acid (PSS) and then dried to form solid electrolyte layer 9.

A dispersion liquid obtained by dispersing graphite particles in water was applied to solid electrolyte layer 9 and then dried to form carbon layer 11 on the surface of the solid electrolyte layer. Then, a silver paste containing silver particles and a binder resin (epoxy resin) was applied onto a surface of carbon layer 11, and thereafter, the binder resin was cured by heating to form silver paste layer 12. In this manner, cathode lead-out layer 10 constituted of carbon layer 11 and silver paste layer 12 was formed.

Thus, capacitor element 2 was obtained.

(2) Assembling of Electrolytic Capacitor

Anode terminal 4, cathode terminal 5, and adhesive layer 14 were disposed on obtained capacitor element 2 and were sealed with outer packaging resin layer 3 containing silica particles as a filler, thereby producing an electrolytic capacitor.

(3) Formation of Silica Film

The electrolytic capacitor produced as above is immersed in a polysilazane solution (with a concentration of 20% by mass) prepared by dissolving perhydropolysilazan in toluene for 3 minutes under a reduced pressure atmosphere and then immersed in the polysilazane solution for 30 minutes under a pressurized atmosphere. Next, an excessive polysilazane solution adhered to the surface of the electrolytic capacitor (outer surface of the outer packaging resin layer) was removed.

After that, heating was performed at about 60° C. for about 90 minutes, and then heating was performed at about 200° C. for about 10 minutes. At this time, remaining polysilazane reacted with moisture, and silica with dense film quality was produced to fill a gap existing in a part of an interface between anode terminal 4 and outer packaging resin layer 3 and a gap existing in a part of an interface between cathode terminal 5 and outer packaging resin layer 3. And silica with dense film quality was also produced to permeate partially into the surface portion of outer packaging resin layer 3.

Comparative Example 1

An electrolytic capacitor was produced in the same manner as in Example 1 except that no silica film was formed.

The electrolytic capacitors of Examples and Comparative Examples produced above were evaluated as follows.

[Evaluation]

An ESR value (mΩ) at a frequency of 100 kHz was measured as an initial ESR value ($X_0$) in an environment at 20° C. for the electrolytic capacitor with an LCR meter for 4-terminal measurement. Next, rated voltage was applied to the electrolytic capacitor for 250 hours at a temperature of 150° C. Thereafter, the ESR value ($X_1$) (mΩ) was measured by the method similar to the above. Then, the ratio of change in ESR was calculated by the following formula.

Ratio of change in ESR (%)=$(X_1-X_0)/X_0 \times 100$

Table I shows the evaluation results.

TABLE 1

|  | Ratio of change in ESR (%) |
| --- | --- |
| Comparative Example 1 | 43 |
| Example 1 | 8 |

In Example 1, the ratio of change in ESR was smaller than that in Comparative Example 1. In Example 1, infiltration of air into the electrolytic capacitor was suppressed by the formation of the silica film, and degradation of a conductive polymer in the solid electrolyte layer due to infiltration of air was suppressed, so that an increase in ESR was suppressed.

Even when the electrolytic capacitor according to the present disclosure is exposed to a high temperature and high humidity atmosphere, the electrolytic capacitor can be applied for various uses requiring excellent sealing properties.

What is claimed is:

1. An electrolytic capacitor comprising:
   a capacitor element;
   a lead electrically connected to the capacitor element;
   an outer packaging resin layer that covers the capacitor element and a part of the lead;
   a silica film that covers only a part of an outer surface of the outer packaging resin layer, and
   a remaining part of the outer surface of the outer packaging resin layer is exposed to atmosphere.

2. The electrolytic capacitor according to claim 1, wherein the silica film fills a gap existing between a surface of the lead and the part of the outer surface of the outer packaging resin layer.

3. The electrolytic capacitor according to claim 1, wherein the silica film permeates partially into a surface portion of the outer packaging resin layer.

4. The electrolytic capacitor according to claim 1, wherein the outer packaging resin layer contains silica particles as a filler.

5. The electrolytic capacitor according to claim 1, wherein the silica film fills at least one selected from the group consisting of irregularity, crack, and hole, the at least one selected from the group consisting of irregularity, crack, and hole existing in the part of the outer surface of the outer packaging resin layer.

6. The electrolytic capacitor according to claim 1, wherein an inner surface of the outer packaging resin layer is in contact with the capacitor element and the lead.

7. The electrolytic capacitor according to claim 1, wherein the capacitor element is disposed away from the outer surface of the outer packaging resin layer so that the outer packaging resin layer is disposed between the capacitor element and the outer surface of the outer packaging resin layer.

* * * * *